March 15, 1955 R. G. STREUBER ET AL 2,704,343
ELECTRIC MOTOR
Original Filed June 14, 1950 4 Sheets-Sheet 1
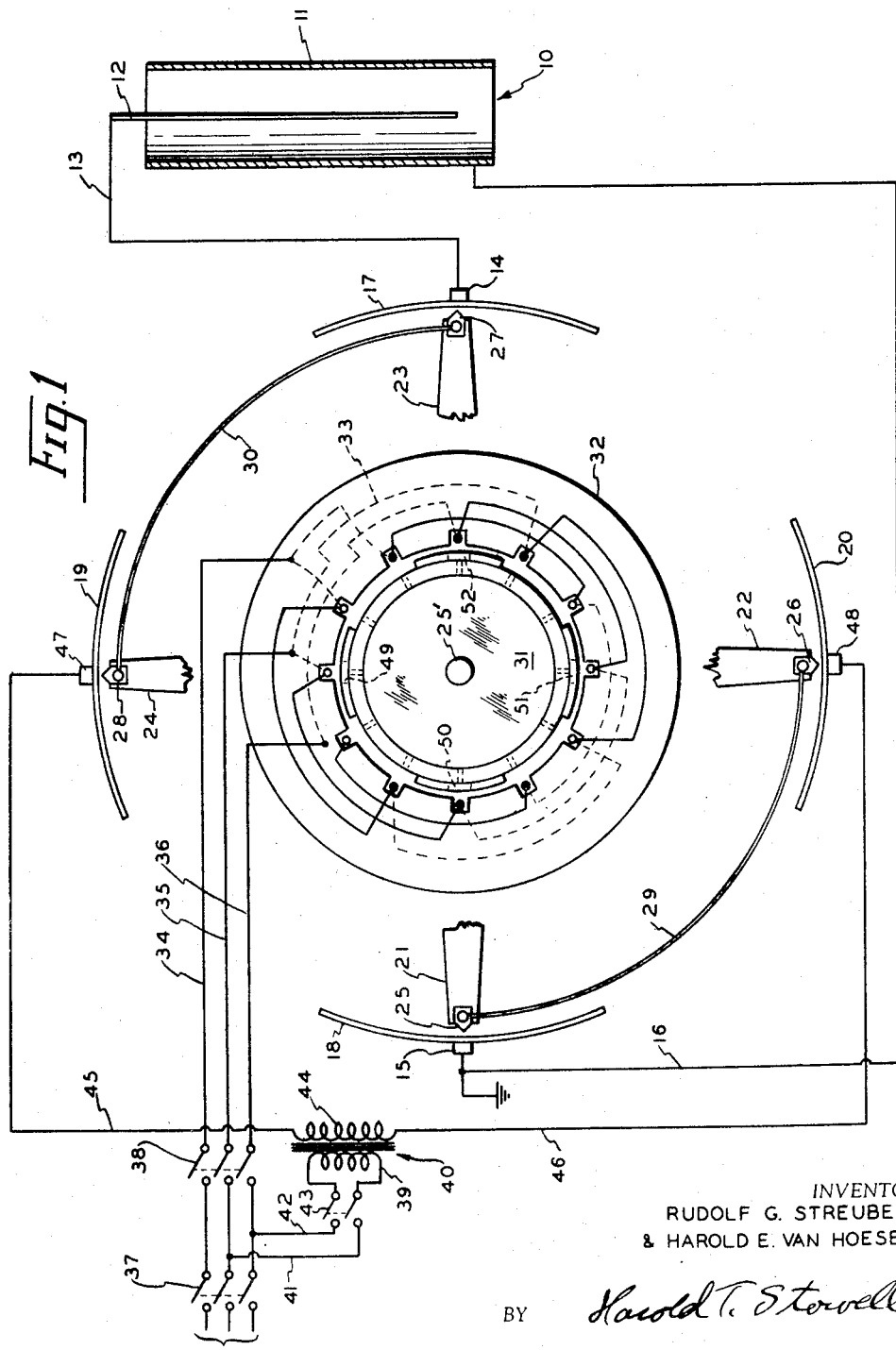
INVENTORS
RUDOLF G. STREUBER
& HAROLD E. VAN HOESEN
BY Harold T. Stowell
ATTORNEY.

March 15, 1955 R. G. STREUBER ET AL 2,704,343
ELECTRIC MOTOR
Original Filed June 14, 1950 4 Sheets-Sheet 2
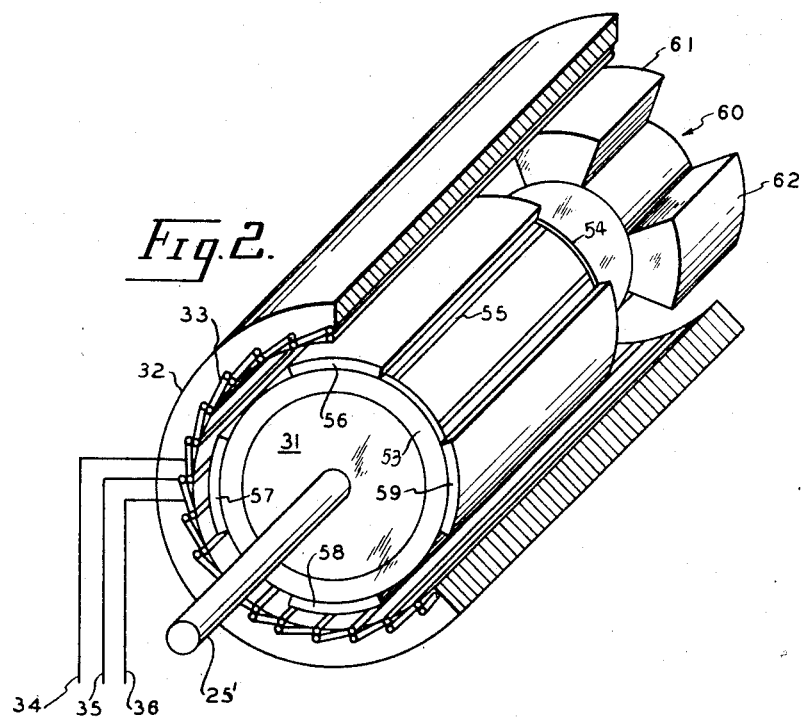
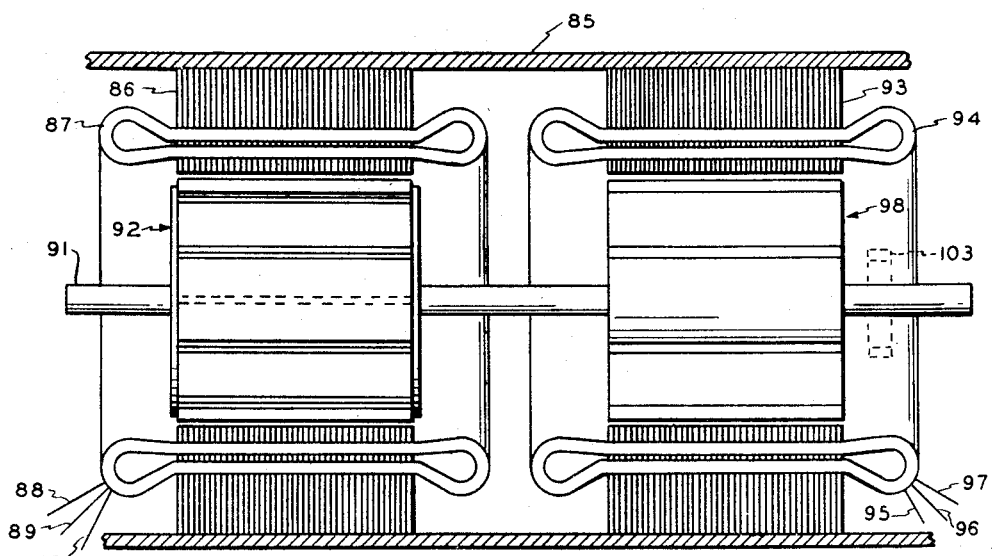
INVENTORS.
RUDOLF G. STREUBER
& HAROLD E. VAN HOESEN
BY Harold T. Stowell
ATTORNEY March 15, 1955　　R. G. STREUBER ET AL　　2,704,343
ELECTRIC MOTOR Original Filed June 14, 1950　　4 Sheets-Sheet 3

INVENTORS
RUDOLF G. STREUBER
& HAROLD E. VAN HOESEN

BY
Harold T. Stowell
ATTORNEY.

March 15, 1955  R. G. STREUBER ET AL  2,704,343
ELECTRIC MOTOR
Original Filed June 14, 1950  4 Sheets-Sheet 4
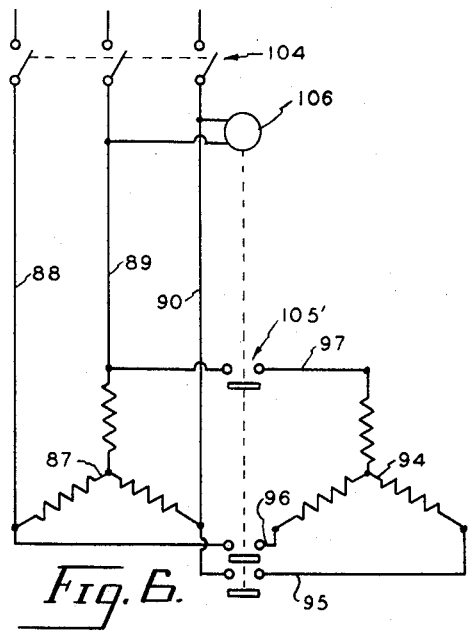
Fig. 6.
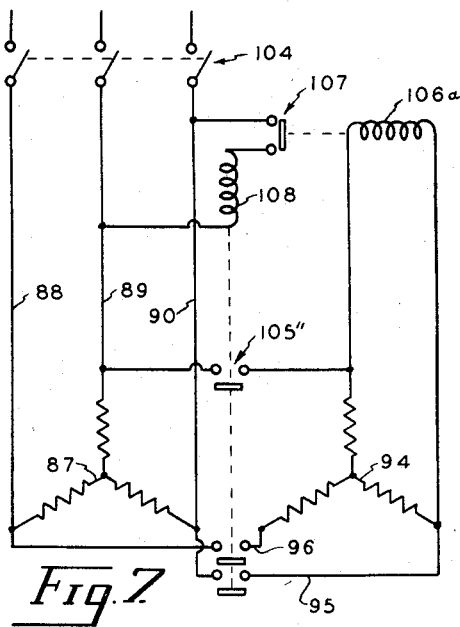
Fig. 7.
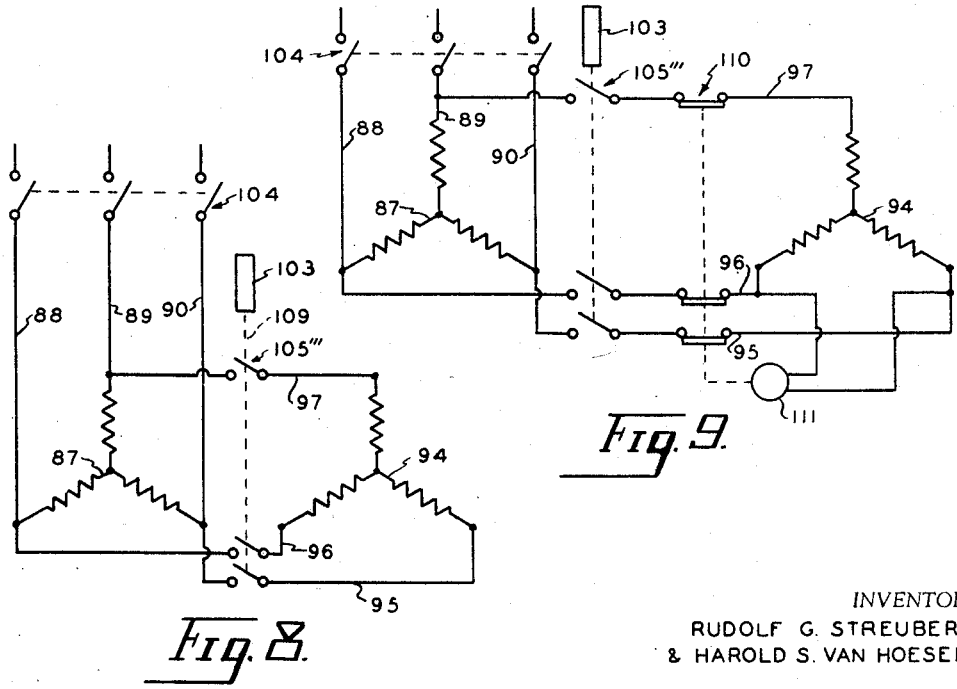
Fig. 8.
Fig. 9.
INVENTORS.
RUDOLF G. STREUBER
& HAROLD S. VAN HOESEN
BY Harold T. Stowell
ATTORNEY

United States Patent Office 2,704,343
Patented Mar. 15, 1955

1

2,704,343

ELECTRIC MOTOR

Rudolf G. Streuber and Harold E. Van Hoesen, Somerville, N. J., assignors to Research Corporation, New York, N. Y., a corporation of New York Original application June 14, 1950, Serial No. 168,034. Divided and this application March 27, 1953, Serial No. 345,106

10 Claims. (Cl. 318—45)

This invention relates to electric motors and more particularly to electric motors of the squirrel cage type wherein the rotor always assumes a definite orientation with relation to the rotating field set up by the alternating current that energizes the motor.

An object of the invention is to provide an electric motor having a rotor that turns in synchronism with the alternating energizing current and takes a predetermined angular relationship with respect thereto.

Another object is to provide a synchronous electric motor especially adapted for driving a synchronous rotary rectifying switch in a manner to assure a preselected polarity of the rectifier output.

Another object is to provide an electric motor of relatively simple construction that is economical to manufacture and has excellent operating characteristics.

Typically, the electric motor of the invention has a stator element, a cooperating rotor element, at least one winding on one of the elements providing, when energized by alternating current, a polarized field rotating with respect to the element having the winding, at least one permanent magnet carried by the other element providing a magnetic field disposed in complementary relation to the polarized rotating field provided by the winding, and a squirrel cage short circuited winding on one of the elements reacting with a polarized field rotating with respect to the cooperating element.

The winding may be carried by either the rotor or the stator and the permanent magnet is carried by the cooperating element. Where the winding serves the dual function of providing a field reacting with both the permanent magnet field and the squirrel cage field, the squirrel cage is carried by the same shaft that carries the permanent magnet. However, where separate windings provide rotating fields reacting separately with the permanent magnet field and the squirrel cage field, the squirrel cage may be carried either by the element that carried the permanent magnet or by the cooperating element; in these forms, the complementary windings are mounted on the opposed motor elements.

The permanent magnet provides a definite polarity which assures proper orientation of the rotor with relation to the rotating field. However, in a motor of this type there is a tendency during starting for the rotating field to exert a partial demagnetizing action of the permanent magnets that reduces the strength and hence the effectiveness of the latter. It is an important object of this invention to provide means for eliminating this effect and insure the maintenance of full strength of the permanent magnets under all operating conditions and at all times.

It is also an object of the invention to provide a permanent magnet oriented rotor for a motor of the above described type which enables the use of a standard rotor without extensive alterations in the rotor structure. We accomplish this object by providing a separate permanent magnet rotor on the same shaft as the main driving rotor, and cooperating with either the same field winding as energize the main rotor or with a separate field winding.

The prevention of demagnetization is accomplished by the provision of means whereby the fields of the armature section and of the permanent magnet section may be separately energized, so that during starting, when the demagnetizing action tends to occur, the winding of the permanent magnet section is not energized, but after substantially synchronous speed has been attained, the winding of the permanent magnet section is energized to orient the rotor.

In the drawings:

Fig. 1 is a diagrammatic view of an electrical precipitation system showing a rotary swtich rectifier driven by an electric motor in accordance with the invention;

Fig. 2 is a perspective view of one form of the motor;

Fig. 3 is an axial sectional view of yet another form of motor in accordance with the invention;

Figs. 5 to 9 are schematic diagrams of circuits for energizing the motor of Figs. 3 and 4.

Figure 4:
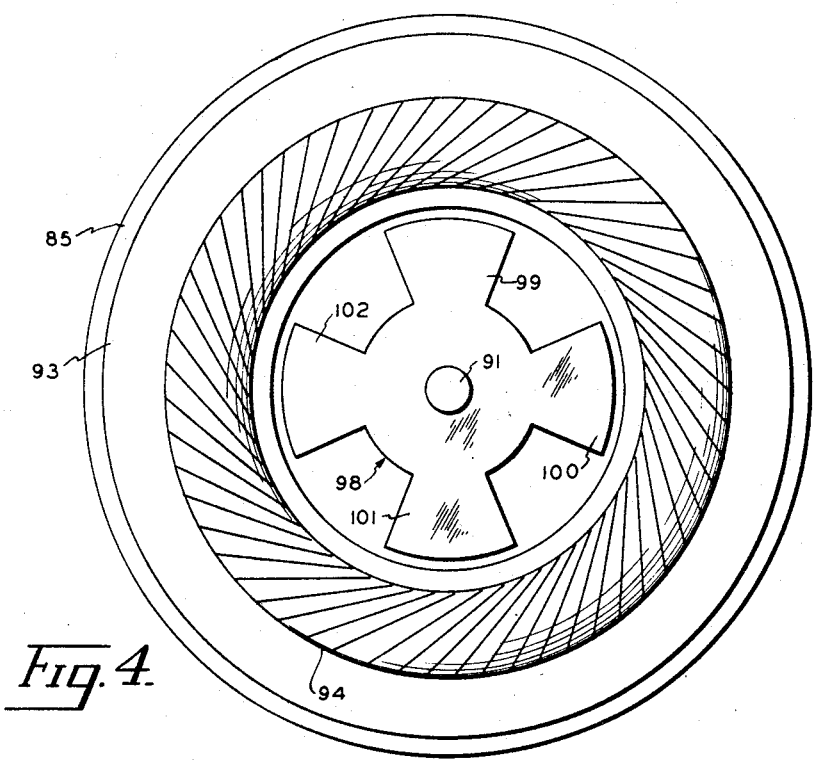
Fig. 4 is a somewhat enlarged right-hand view of the motor of Fig. 3.

Referring to the drawings, particularly to Fig. 1 thereof, the electrical precipitation system shown has an electrical precipitator designated by the general reference numeral 10. The precipitator includes an extended surface electrode 11 in the form of a metallic tube that provides a conduit for a stream of gas to be cleaned and an isolated discharge electrode 12 in the form of a fine wire extending axially substantialy through the bore of the tube.

The precipitator is conventional and operated in a well known manner. When high potential unidirectional current is applied between the discharge and extended surface electrodes, corona discharge occurs at the fine wire electrode 12. If gas carrying suspended particles is passed through the tube 11, the particles become charged and are attracted to and precipitated largely upon the inner wall of the tube 11 from which the precipitated particles are removed from time to time.

In order to achieve substantially uniform operating conditions, it is necessary that the polarity of the current applied to the precipitator electrodes be the same at all times. Commonly, the discharge electrode 12 is maintained electrically negative and the extended surface electrode is grounded.

As shown in Fig. 1, the discharge electrode is connected by a cable 13 to the isolated output terminal 14 of a rotary switch rectifier, the other output terminal 15 of which is grounded and is also connected through a cable 16 to the extended surface electrode 11 of the precipitator.

Rotary switch rectifiers of the type shown are well known in the art. The switch has output collector shoes 17 and 18 connected to their respective output terminals. These shoes are arcuate segments and are disposed 180° apart. Input shoes 19 and 20 are disposed in the circle defined by the output shoes and are positioned diametrically opposite each other and 90° from the output shoes.

The rectifier switch has a rotor including four arms 21, 22, 23 and 24 carried by and extending radially from the shaft 25' and disposed 90° apart. These arms are made of electrically insulating material and terminate at their outer ends in conductive pointed members 25, 26, 27 and 28. The conductive tips 25 and 26 are connected together by a jumper wire 29 and the tips 27 and 28 are similarly interconnected by a jumper wire 30. As the rotor is turned by the shaft 25', the tips of the arms pass in succession adjacent to the shoes 17, 18, 19 and 20.

An electric motor drives the shaft 25' at synchronous speed. This motor has a rotor 31, including a squirrel cage winding, that turns the shaft 25'. The rotor revolves within a stator 32 having a three-phase, four-pole winding 33 supplied with three-phase alternating current through the lead wires 34, 35 and 36. Current from the line L is delivered to the lead wires through switches 37 and 38.

Single phase alternating current is tapped from the line L and is fed to the primary winding 39 of a power transformer 40 through conductors 41 and 42 and switch 43. The stepped-up voltage of the transformer secondary winding 44 is applied through conductors 45 and 46 to the rectifier switch input terminals 47 and 48 that are connected to the input shoes 19 and 20 respectively.

As thus far described, the electrical precipitation system is of the usual and known type. Assuming that three-phase, 60 C. P. S. current is supplied by the line L, the rectifier induction motor is wound to rotate at 1800 R. P. M. The arms of the switch rotor are oriented on the shaft 25' so that at synchronous speed, the voltage delivered by the power transformer 40 will be a maximum in the negative sense at the rectifier input terminal 47 when the switch rotor is in the position illustrated in Fig. 1. This negative potential is delivered to the precipitator discharge electrode 12 through the input shoe 19, across the gap to the tip 28, through the jumper wire 30 to the tip 27, across the gap to the output shoe 17, and through the output terminal 14 and cable 13. The circuit from the precipitator to the lower positive end of the transformer secondary winding 44 is completed through the cable 16, output terminal 15, shoe 18, rotor tip 25, jumper wire 29, tip 26, shoe 20, input terminal 48 and conductor 46.

Assuming clockwise rotation of the rectifying switch rotor, when the lower end of the power transformer secondary winding is at peak negative potential one-half cycle later than the condition described in the immediately preceding paragraph, the switch rotor will have advanced one-quarter of a revolution. The jumper wire 30 will connect the then negative input terminal 48 with output terminal 14 and with the discharge electrode 12, and the jumper wire 29 will complete the return circuit from the extended surface electrode 11 to the upper end of the secondary winding of power transformer.

In this manner, the rectified current supplied to the discharge electrode is maintained negative provided that the polarity induced in the shaded squirrel cage rotor is such as to establish the described conditions. However, with a conventional cage rotor shaded to provide four salient poles, it is a matter of accident whether the poles acquire the desired polarities or whether they acquire polarities opposite to that desired. In the latter case, the rotor 31 will lock in step with the rotating four-pole field provided by the stator winding 33, but it will be displaced 90 mechanical degrees from the desired position. Under these conditions, the discharge electrode 12 will be positively charged. It will thus be seen that the polarity of the rectified current applied to the precipitator is a matter of chance when the ordinary squirrel induction motor is employed.

This difficulty is overcome, as shown in our copending application, Serial No. 294,201, filed June 18, 1952, for a System for Energizing Electrical Precipitators by providing permanent magnets 49, 50, 51 and 52 imbedded in the squirrel cage rotor, preferably in those sectors of the periphery thereof that are shaded to provide by induction the usual salient poles. By way of example, the diametrically opposite permanent magnets 49 and 51 may be so disposed as to provide north poles at their radially outer extremities and the permanent magnets 50 and 52 are positioned so that their radially outer ends provide south poles. With this arrangement, the rotor will lock in with the four-pole rotating field of the energized stator in one of two possible positions that are 180° apart because the permanent magnets seek complementary poles of the rotating field. It will be understood that the rotating field has four poles spaced 90° apart, one pair of diametrically opposite poles being north poles and the other pair being south poles. The north poles of the rotor will seek the south poles of the rotating field and the south poles of the rotor will seek the north poles of the rotating field. The polarity induced in the squirrel cage rotor by the rotating field will coincide with the polarity established by the permanent magnets.

It will be understood that the switch rotor is oriented on the shaft 25' in such position that the polarity of the rectifier output current is that which is desired. From the foregoing discussion it will also be seen that the polarity of the rectifier output current will be the same regardless of which of the two possible positions is assumed by the squirrel cage rotor.

The motor shown in Fig. 2 differs from the motor of Fig. 1 primarily in that the permanent magnet means is separate from the squirrel cage rotor. It is carried by a common shaft and reacts with a field generated by a common stator winding. The shaft 25' is mounted in the usual bearings (not shown) and carries the squirrel cage rotor 31 having short-circuiting rings 53 and 54 at the ends thereof. Longitudinal conducting bars 55 are spaced about the periphery of the rotor and the ends of the bars are in electrical contact with the short-circuiting rings to form a conventional squirrel cage rotor. Twelve bars spaced 30° apart are typical in such construction.

The rotor 31 is of the conventional squirrel cage type and is not provided with permanent magnets in the pole pieces 56, 57, 58 and 59. A separate permanent magnet rotor 60 is mounted on the shaft 25' and rotates within the stator 32. The permanent magnet rotor is shaped generally in the form of a maltese cross and has four pole pieces spaced 90° apart, two of which 61 and 62 appear in the perspective view. The pole pieces of the permanent magnet are in axial alignment with the salient poles of the squirrel cage rotor 31. Typically, the pole piece 61 and the pole piece diametrically opposed thereto provide north poles and the other pair of diametrically opposed pole pieces provide south poles.

The operation of the motor of Fig. 2 is similar to the operation of the motor of Fig. 1 as described hereinbefore. The winding 33 is energized to create a rotating four-pole field, the opposite poles of which have like polarity and the adjacent poles of which have opposite polarity. Polarity is induced in the squirrel cage rotor 31 and the rotor assembly comes up to synchronous speed as the rotating field reacts with the polarized fields of both the squirrel cage and permanent magnet portions of the rotor. During the time that the rotor is accelerating, the fixed polarity of the permanent magnet field draws the rotor into step with the rotating field created by the winding 33 in a position such that the salient poles induced in the squirrel cage rotor portion 31 correspond in sign with the permanent magnet poles aligned therewith. In the described embodiment, because the permanent magnet pole piece 61 is a north pole, the salient poles in the squirrel cage rotor at the elements 56 and 58 will be north poles. Similarly, the salient poles at 57 and 59 will be south poles at synchronous speed.

It will be understood that, in the form of the invention of Fig. 2, the rotor assembly can be oriented with respect to the rotating field in only one of the two positions that are 180° apart.

Referring to Figs. 3 and 4, the motor therein shown is similar to the motor of Fig. 2 in that it has a squirrel cage rotor portion that is separate from the permanent magnet rotor portion, both rotor portions being mounted on a common shaft. The motor differs, however, in that two separate stator windings are employed to react with the separate rotor portions, whereas in the motor of Fig. 2, a common stator winding is used.

Referring to Figs. 3 and 4, the electric motor shown has a housing 85. At the left of the housing and supported therein is a laminated stator core 86 having a three-phase four-pole winding 87 supplied with current through wires 88, 89 and 90. Rotating within the core 86 on a shaft 91 is a squirrel cage rotor 92 substantially identical with the rotor portion 31 of Fig. 2. The rotor 92 has no permanent magnets.

At the right of the housing is another laminated stator core 93 having a three-phase four-pole winding 94 supplied with current through the lead wires 95, 96 and 97. Rotating within this core is a four-pole permanent magnet rotor 98 that is similar to the rotor portion 60 of Fig. 2. The permanent magnet rotor is carried by the shaft 91 that also carries the squirrel cage rotor 93. It will be understood that the shaft 91 is journalled in suitable bearings (not shown) and that the assembly including the shaft 91, the squirrel cage rotor 92 and permanent magnet rotor 98 rotates as a unit.

As best seen in Fig. 4, the permanent magnet rotor 98 has four pole pieces 99, 100, 101 and 102. The pole pieces 99 and 101, that are diametrically opposed to each other, may be north pole pieces while the pole pieces 100 and 102, that are spaced on centers 90° from the pole pieces 99 and 101, are south pole pieces.

A centrifugal switch 103 may be mounted on the motor shaft 91 for a purpose that will appear hereinafter.

In the motors described with reference to Figs. 1 and 2, there is a tendency during starting for the rotating field to exert a partial demagnetizing action on the permanent magnets that reduces the effectiveness of the latter. In the motor of Figs. 2 and 4, wherein the fields of the squirrel cage and permanent magnet motor sections may be separately energized, it is possible to start the motor by energizing only the winding of the squirrel cage motor section. Then, after the motor has accelerated to substantially synchronous speed, the winding of the permanent magnet section is energized to orient the rotor. Thereafter, both windings may be continuously energized to deliver power to the shaft, or the permanent magnet motor section winding may be deenergized and this section may be allowed to idle. Because the permanent magnet motor section is not energized until substantially synchronous speed is reached, the rotating field exerts no substantial demagnetizing action on the permanent magnets of the rotor.

Figure 5:
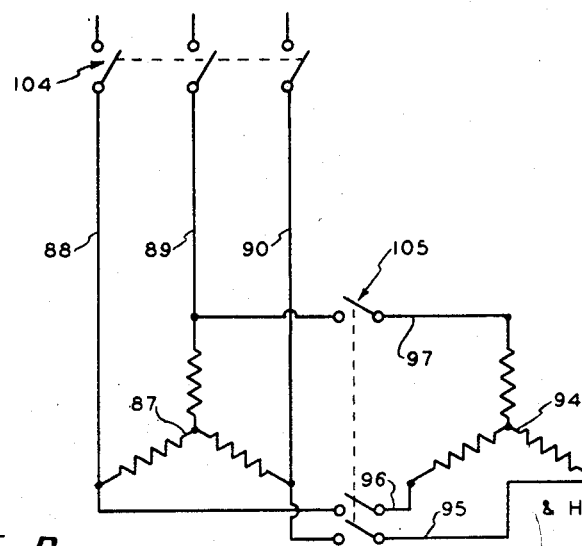

A manually controlled energizing circuit for the motor of Figs. 3 and 4 is shown in Fig 5. In this circuit, the winding 87 of the squirrel cage motor section is energized from the line through a switch 104 and the winding 94 of the permanent magnet motor section is connected in parallel with the winding 87 through a switch 105. The motor is started by closing switch 104 leaving switch 105 open. When the squirrel cage motor section has accelerated the rotor sufficiently, the switch 105 is closed to energize the permanent magnet motor section and to orient the rotor. Thereafter, switch 105 may remain closed, or it may be opened to allow the permanent magnet motor section to idle.

In the circuit of Fig. 6, the winding of the squirrel cage motor section is energized by closing the switch 104. A timing motor 106 is simultaneously energized; this motor, after a preselected time interval for which the timing motor is set, operates to close the switch 105' and to connect the winding 94 of the permanent magnet motor section in parallel with the winding 87.

In the circuit of Fig. 7 the solenoid coil 106a of a relay is connected across two of the terminals of the winding 94 of the permanent magnet motor section. When a preselected voltage is applied to the coil 106a, switch 107 is closed. The closing of switch 107 energizes the coil 108 of a solenoid which, in turn, closes the switch 105'' thereby energizing the winding 94 of the permanent magnet motor section. It will be understood that, during starting when the permanent magnet motor section is driven by the squirrel cage motor section, the former acts as a generator providing a voltage in the winding 94 dependent on the speed of the rotor. It is this voltage that actuates the relay 106a.

The circuit of Fig. 8 is similar to that of Fig. 6. However, the switch 105''' is controlled by the centrifugal switch 103 that is mounted on the rotor shaft through actuating mechanism designated 109. The centrifugal switch is pre-set to effect closing of the switch 105''' when the speed of the shaft reaches a predetermined value.

The energizing circuit shown in Fig. 9 adds to that shown in Fig. 8 a time controlled switch 110 actuated by a timing motor 111 that is energized concurrently with the permanent magnet motor section winding 94 to disconnect the winding 94 from the source of power after the rotor has been oriented. In starting the motor, the time controlled switch 110 is closed and the centrifugally controlled switch 105''' is open. Main switch 104 is closed and the motor accelerates under the driving influence of the squirrel cage motor section. When synchronous speed has been substantially attained, the centrifugal switch 103 is actuated to effect closing of the switch 105''', thus energizing the winding 94 and setting the polarity of the rotor. The closing of switch 105''' starts the timing motor 111 which, after a predetermined time interval sufficient to assure proper orientation of the rotor, opens the switch 110 to deenergize the winding 94 and to allow the permanent magnet motor section to idle.

From the foregoing description, it will be seen that a variety of modifications may be made in the motor of the invention without departing from the spirit of the invention. For example, in the motor shown in Figs. 3 and 4, the squirrel cage motor section may be modified to have the squirrel cage portion in the stator element and the energizing winding in the rotor element. Also, the permanent magnet motor section may be similarly modified to provide permanent magnets in the stator element and a cooperating winding in the rotor element. It will also be apparent that the motors described may be wound for single phase alternating current or for polyphase alternating current other than three phase in accordance with known principles.

The present application is a division of application Serial No. 168,034, filed June 14, 1950, now abandoned.

We claim:

1. An electric motor comprising a stator element, a cooperating rotor element having a rotor shaft, a winding on said stator element providing when energized a four-pole field rotating with respect to said stator element, four salient poles on said rotor element, permanent magnet means axially spaced from said rotor element and mounted on said rotor shaft for rotation therewith, said permanent magnet means providing a four-pole magnetic field disposed in complementary relation to the rotating field provided by said winding, the said four salient pole pieces being polarized by induction from and reacting with the rotating field provided by said winding.

2. An electric motor comprising a stator element, a cooperating rotor element, a driving motor section including a first winding on one of said elements providing when energized by alternating current a first polarized field rotating with respect to said first winding, and a second winding on the other of said elements reacting with said polarized field provided by said first winding to produce motor action, and a permanent magnet orientation motor section including a third winding on one of said elements providing when energized by alternating current a second polarized field rotating with respect to the element carrying said third winding and in synchronism with said first polarized field, and permanent magnet means carried by the complementary motor element of the orientation motor section providing a magnetic field disposed in complementary relation to the rotating field provided by said third winding, said second winding having salient poles providing for synchronous operation with respect to said first polarized field.

3. The invention recited in claim 2 and means for energizing said third winding after said first winding is energized.

4. The invention according to claim 3, said last means comprising means for energizing said third winding after the rotor element has attained substantially synchronous speed, whereby predetermined definite orientation of the rotor with relation to the rotating field is attained.

5. The invention according to claim 4, and further means for deenergizing said third winding after said definite orientation of the rotor is obtained.

6. The invention according to claim 5, said further means comprising a timing-switch for deenergizing the third winding, a predetermined time interval after it is energized.

7. The invention according to claim 4, said means for energizing the third winding comprising a timing switch for closing the circuit for said third winding a predetermined time interval after the first winding is energized.

8. The invention according to claim 4, said means for energizing the third winding comprising a voltage-controlled switch actuated by said third winding when a predetermined voltage is attained therein.

9. The invention according to claim 4, said means for energizing the third winding comprising a centrifugal switch mounted for rotation with the motor shaft.

10. An electric motor comprising a stator element, a cooperating rotor element, a squirrel cage motor section including a first three-phase four-pole winding on said stator element providing when energized by three-phase alternating current a four-pole field rotating with respect to said stator, and a complementary squirrel cage winding carried by said rotor element, said squirrel cage winding having four salient poles therein polarized by induction from the rotating field; and a permanent magnet motor section including a second three-phase four-pole winding on said stator element providing when energized by three-phase alternating current a four-pole field rotating with respect to said stator, and permanent magnet means carried by said rotor element providing a four-pole magnetic field disposed in complementary relation to the rotating field provided by said second winding.

References Cited in the file of this patent

UNITED STATES PATENTS 2,442,626   Tolson et al. _____ June 1, 1948